US010857596B1

(12) United States Patent
Mittendorf et al.

(10) Patent No.: US 10,857,596 B1
(45) Date of Patent: Dec. 8, 2020

(54) METHOD OF PRODUCING AN ABRASIVE TIP FOR A TURBINE BLADE

(71) Applicant: HONEYWELL INTERNATIONAL INC., Morris Plains, NJ (US)

(72) Inventors: Don Mittendorf, Mesa, AZ (US); Jason Smoke, Phoenix, AZ (US); Brent Ludwig, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 276 days.

(21) Appl. No.: 16/127,383

(22) Filed: Sep. 11, 2018

(51) Int. Cl.
| *B22F 5/04* | (2006.01) |
| *F01D 5/20* | (2006.01) |
| *B22F 3/15* | (2006.01) |
| *B23P 15/04* | (2006.01) |
| *B29C 43/10* | (2006.01) |

(52) U.S. Cl.
CPC ................... *B22F 5/04* (2013.01); *B22F 3/15* (2013.01); *B22F 3/156* (2013.01); *B23P 15/04* (2013.01); *F01D 5/20* (2013.01); *B29C 2043/106* (2013.01); *F05D 2230/23* (2013.01); *F05D 2230/42* (2013.01)

(58) Field of Classification Search
CPC ...... B29C 2043/106; B22F 3/15; B22F 3/156; B22F 5/04; B23P 15/04; F01D 5/20; F05D 2230/23; F05D 2230/42
See application file for complete search history.

(56) References Cited

U.S. PATENT DOCUMENTS

| 4,689,242 A | 8/1987 | Pike |
| 4,741,973 A | 5/1988 | Condit et al. |
| 5,264,011 A * | 11/1993 | Brown ................... B22F 5/04 29/889.2 |
| 5,359,770 A | 11/1994 | Brown et al. |
| 5,997,273 A | 12/1999 | Laquer |
| 8,266,801 B2 | 9/2012 | Clark et al. |
| 8,628,821 B2 | 1/2014 | Wang et al. |
| 8,642,122 B2 | 2/2014 | Wang et al. |

(Continued)

OTHER PUBLICATIONS

Zelahy, J.W. et al., Materials for Advanced Turbine Engines, Project Completion Report, Project 3 Advanced Blade Tip Seal System, vol. I; Dec. 31, 1985.

(Continued)

*Primary Examiner* — Christopher J Besler
*Assistant Examiner* — Christine Bersabal
(74) *Attorney, Agent, or Firm* — Lorenz & Kopf, LLP

(57) ABSTRACT

A method of producing an abrasive tip for a turbine blade includes producing or obtaining a metal powder that is mixed with an abrasive ceramic powder and producing or obtaining a metallic mold that is in the shape of an airfoil. The metallic mold includes a hollow interior portion. The method further includes sealing the metal and ceramic powder mixture within the hollow interior portion of the metallic mold under vacuum and subjecting the sealed mold to a hot isostatic pressing process. The hot isostatic pressing process compacts and binds the metal and ceramic powder mixture together into a solid article in the shape of the airfoil. Still further, the method includes slicing the solid article into a plurality of airfoil-shaped slices and bonding one slice of the plurality of airfoil-shaped slices to a tip portion of a turbine blade.

20 Claims, 3 Drawing Sheets

(56) References Cited

U.S. PATENT DOCUMENTS

| | | |
|---|---|---|
| 9,085,980 B2 | 7/2015 | Mittendorf et al. |
| 9,120,151 B2 | 9/2015 | Godfrey et al. |
| 9,522,426 B2 | 12/2016 | Das et al. |
| 2003/0088980 A1 | 5/2003 | Arnold |
| 2005/0142023 A1* | 6/2005 | Voice .................. B30B 11/001 419/38 |
| 2006/0039788 A1 | 2/2006 | Arnold et al. |
| 2006/0260125 A1 | 11/2006 | Arnold et al. |
| 2015/0132605 A1 | 5/2015 | Kumar et al. |

OTHER PUBLICATIONS

Das, S. et al.; Direct laser fabrication of superalloy cermet abrasive turbine blade tips; Materials & Design vol. 21, Issue 2, Apr. 1, 2000, pp. 63-73.
McLean, A.F.; Development Progress on Ceramic Turbine Stators and Rotors; an ASME publication; 1975.

* cited by examiner

METHOD OF PRODUCING AN ABRASIVE TIP FOR A TURBINE BLADE

STATEMENT REGARDING FEDERALLY SPONSORED RESEARCH OR DEVELOPMENT

This invention was made with Government support under DTFAWA-15-A-80017 awarded by the Federal Aviation Administration. The Government has certain rights in this invention.

TECHNICAL FIELD

The present disclosure generally relates to turbine engine technologies. More particularly, the present disclosure relates to a method of producing an abrasive tip for a turbine blade.

BACKGROUND

Turbine engines are used as the primary power source for various kinds of vehicles, such as aircraft. Turbine engines are also used as auxiliary power sources that drive air compressors, hydraulic pumps, and industrial gas turbine (IGT) power generation. Furthermore, the power from turbine engines may be used for stationary power supplies such as backup electrical generators and the like.

Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Turbine engines use the power created by the rotating turbine disk to power a bladed compressor that draws more air into the engine and to energize fan blades, propellers, electrical generators, or other devices, depending on the type of turbine engine.

Because turbine engines provide power for many primary and secondary functions, it is important to optimize the operating efficiency of compressors and turbines. One way to maximize compressor and turbine efficiency is to minimize high-pressure air leakage between the tips of the blades and the adjacent shroud. In order to accomplish this objective, compressor or turbine blade dimensions are tightly controlled and blade tips can be machined so the installed blades span a diameter that is just slightly smaller than the shroud inner diameter. Improvements in compressor or turbine performance are possible when compressor or turbine blade tips can tolerate interference rubs with the adjacent shroud without experiencing significant blade tip wear. That is, wear of blade tips during a rub is undesirable because clearances increase, producing an associated reduction in compressor or turbine performance.

The prior art contains examples of attempted solutions to this rubbing problem by using abrasive particles embedded in the blade tip. For example, U.S. Pat. No. 5,704,759 discloses a turbine blade body having a tip portion that is coated with an abrasive material. The abrasive material includes a dispersion of discrete particles of cubic boron nitride (CBN) that are formed on the blade tip by an entrapment plating method wherein the CBN particles are entrapped in electroplated nickel with their tips (cutting edges) exposed. However, experience has shown that these abrasive tips are not durable for long-term engine use, at least in part due to limitations in the blade tip design as a result of the fabrication techniques employed.

Accordingly, it would be desirable to provide an improved method of producing an abrasive tip for a turbine blade. The method would desirably avoid fabrication methods that limit the design of the blade tip. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to a method of producing an abrasive tip for a turbine blade. As such, in one exemplary embodiment, a method of producing an abrasive tip for a turbine blade includes producing or obtaining a metal powder that is mixed with an abrasive ceramic powder and producing or obtaining a metallic mold that is in the shape of an airfoil. The metallic mold includes a hollow interior portion. The method further includes sealing the metal and ceramic powder mixture within the hollow interior portion of the metallic mold under vacuum and subjecting the sealed mold to a hot isostatic pressing process. The hot isostatic pressing process compacts and binds the metal and ceramic powder mixture together into a solid article in the shape of the airfoil. Still further, the method includes slicing the solid article into a plurality of airfoil-shaped slices and bonding one slice of the plurality of airfoil-shaped slices to a tip portion of a turbine blade.

In another exemplary embodiment, a method of producing an abrasive tip for a turbine blade includes producing or obtaining a metal powder that is mixed with an abrasive ceramic powder and producing or obtaining a metallic mold that is in the shape of an airfoil. The metallic mold comprises a hollow interior portion. The ceramic powder consists of particles having a mean diameter (d50) of from about 10 microns to about 1000 microns. The metal and ceramic powder mixture has a weight ratio of metal powder to ceramic powder of from about 100:1 to about 10:1. The method further includes sealing the metal and ceramic powder mixture within the hollow interior portion of the metallic mold under vacuum and subjecting the sealed mold to a hot isostatic pressing process, whereby the hot isostatic pressing process compacts and binds the metal and ceramic powder mixture together into a solid article in the shape of the airfoil. Still further, the method includes slicing the solid article into a plurality of airfoil-shaped slices and bonding one slice of the plurality of airfoil-shaped slices to a tip portion of a turbine blade. Bonding the one slice is performed using diffusion bonding or transient liquid phase bonding.

In yet another exemplary embodiment, a method of producing an abrasive tip for a turbine blade includes producing or obtaining a metal powder that is mixed with an abrasive ceramic powder and producing or obtaining a metallic mold that is in the shape of an airfoil, wherein the metallic mold comprises a hollow interior portion. The ceramic powder consists of particles having a mean diameter (d50) of from about 50 microns to about 500 microns. The metal and ceramic powder mixture has a weight ratio of metal powder to ceramic powder of from about 50:1 to about 20:1. The metallic mold is produced using an additive manufacturing process. The method further includes sealing the metal and ceramic powder mixture within the hollow interior portion of the metallic mold under vacuum and subjecting the sealed mold to a hot isostatic pressing process, whereby the hot isostatic pressing process compacts and binds the metal and ceramic powder mixture together into a solid article in the shape of the airfoil. Furthermore, the method includes slicing the solid article into a plurality of airfoil-shaped slices and bonding one slice of the plurality of airfoil-shaped slices to a tip portion of a turbine blade. Bonding the one slice is performed using diffusion bonding or transient liquid phase bonding. Still further, the method includes performing a finishing process on the turbine blade after the step of bonding the one slice. The finishing process is selected from the group consisting of: heat treating, machining, surface finishing, polishing, and coating.

This Brief Summary is provided to describe select concepts in a simplified form that are further described in the Detailed Description. This Brief Summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any method embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. As further used herein, the word "about" means a possible variance (+/−) of the stated value of up to 10%, or alternatively up to 5%, or no variance at all. Furthermore, there is no intention to be bound by any expressed or implied theory presented in the preceding technical field, background, brief summary, or the following detailed description.

The present disclosure generally provides embodiments of a method of producing an abrasive tip for a turbine blade. In accordance with these embodiments, a metal powder is prepared using an atomization process. The metal powder is an alloy that is suitable for use in a turbine blade, such as (but not limited to) a nickel-based superalloy. A hard, abrasive ceramic powder is then mixed into the metal powder. The ceramic powder may be alumina, zirconia, silicon carbide, or a mixture of two or more thereof. Other ceramic powders may alternatively be used, such as those known in the art. A metallic mold is then produced, which may optionally be in the shape of an airfoil, such as in the desired shape of the turbine blade tip, or in a more simple shaped mold which may be machined post-build. The metal and ceramic powder mixture is then sealed within the mold. The sealed mold is subjected to a hot isostatic pressing process, which compacts and binds the powder mixture together. The compacted and bonded powder mixture is then sliced into pieces of appropriate thickness for the turbine blade tip. A slice may be bonded to the turbine blade using, for example, diffusion bonding or transient liquid phase bonding.

Turbine Blade

Figure 1:
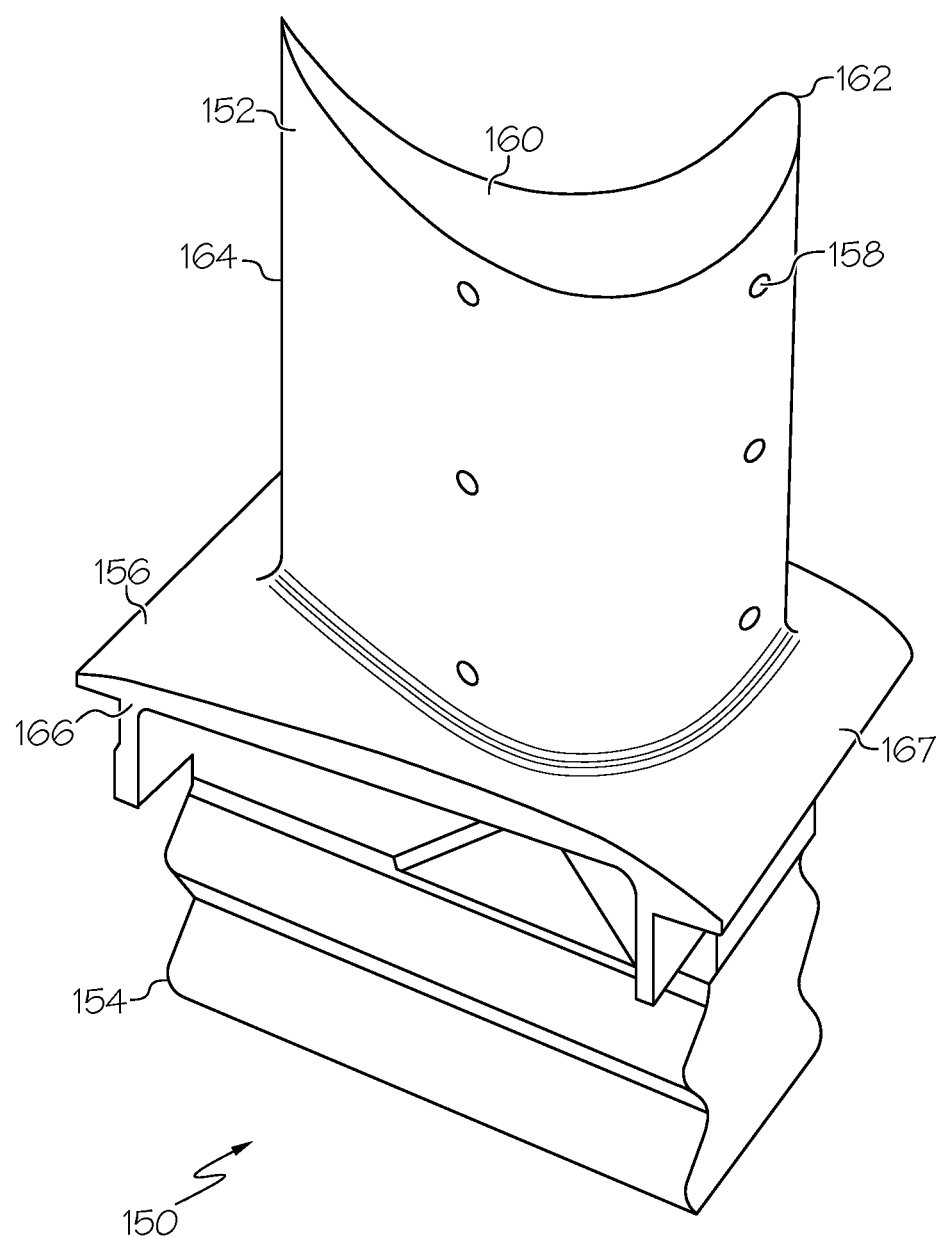
FIG. 1 is a perspective view of a blade for a turbine according to an embodiment of the present disclosure.

Turning now to FIG. 1, an exemplary turbine blade 150 is illustrated. The turbine blade 150 is exemplary of the type of turbine blades that are used in the turbine engines. Turbine blades commonly have a different shape, dimension, and size depending on gas turbine engine models and applications. In a typical turbine engine, multiple turbine blades 150 are positioned in adjacent circumferential positions along a hub or rotor disk. The turbine blades are typically made from advanced superalloys such as IN713, IN738, IN792, MarM247, GTD111, Rene142, Rene N5, SC180, and CMSX4 to name several non-exclusive examples.

The turbine blade 150 includes an airfoil 152. The airfoil 152 includes a concave curvature face and a convex face. In operation, hot gases impinge on the airfoil 152 concave face and thereby provide the driving force for the turbine engine. The airfoil 152 includes a leading edge 162 and a trailing edge 164 that firstly and lastly encounter an air stream passing around airfoil 152. The blade 150 also includes a tip 160. In some applications the tip may include a recessed pocket forming what is commonly known as a squealer tip.

The turbine blade 150 may be mounted on a turbine disk that is part of a non-illustrated wheel. The blade 150 is attached to the disk by a fir tree or dovetail attachment 154 that extends downwardly from the airfoil 152 and engages a non-illustrated slot on the turbine wheel. A platform 156 extends longitudinally outwardly from the area where the airfoil 152 is joined to the attachment 154. A number of cooling channels desirably extend through the interior of the airfoil 152, ending in trailing edge or pressure side discharge slots. Film cooling holes 158 may also be present in the airfoil surface.

Tip Alloy Composition

In accordance with the present disclosure, for the turbine blade tip, a metal powder is prepared using an atomization process. The metal powder is an alloy that is suitable for use in a turbine blade, such as (but not limited to) a nickel-based superalloy. Within the scope of nickel-based superalloys, some compositions have proven particularly effective for turbine blade tips. For example, U.S. Patent Application Publication 2014/0134353 discloses a nickel-based superalloy that includes, by weight, about 1.5% to about 5.5% chromium, about 8% to about 12% aluminum, about 4% to about 8% tantalum, about 1.5% to about 5.5% tungsten, less than about 1% of one or more of elements selected from a group consisting of carbon, boron, zirconium, yttrium, hafnium, and silicon, and a balance of nickel. The '353 Publication discloses that this alloy may be laser-welded onto the tip region of a turbine blade.

In another example, U.S. Patent Application Publication 2011/0135489 discloses a nickel-based superalloy that includes, by weight, about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel. The '489 Publication discloses that this alloy may be cast into the shape of a blade tip, and then diffusion bonded onto a turbine blade.

Of course, other nickel-based superalloys may be suitable for use as a turbine blade tip material of the present disclosure; the foregoing examples are intended to provide but a sampling of the possible alloy compositions.

As initially noted, a metal alloy as described above is prepared in the form of a powder using an atomization process. Thereafter, the metal powder is mixed with a hard, abrasive ceramic powder. The ceramic powder may be alumina, zirconia, silicon carbide, or a mixture of two or more thereof. The ceramic powder particles may have a mean diameter that maximizes their abrasive quality, such as a mean diameter (d50) of anywhere from about 10 microns to about 1000 microns, or from about 50 microns to about 500 microns. The ceramic powder may be mixed with the metal powder at a suitable weight ratio to create a blade tip material with desirable abrasive properties, such as a weight ratio of the metal powder to the ceramic powder of about 100:1 to about 10:1, or about 50:1 to about 20:1.

Hot Isostatic Pressing

As known in the art, hot isostatic pressing (HIP) is a process that can consolidate metal powder into a solid component. The powder is disposed within a sealed "can", and the sealed can is placed inside of a vessel and subjected to a high pressure, inert gas at elevated temperatures.

Figure 2:
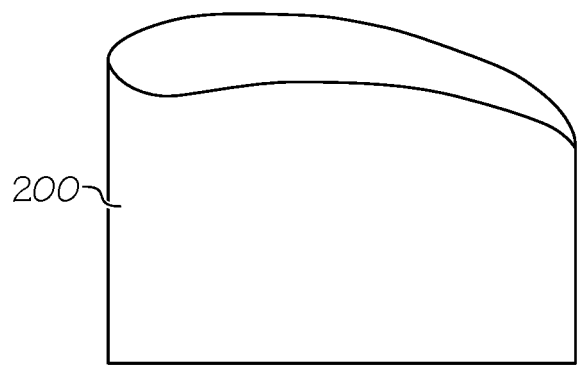
FIG. 2 illustrates an exemplary metallic mold (or "HIP can") in the shape of an airfoil, in accordance with an embodiment of the present disclosure.

For the purposes of HIP in accordance with the present disclosure, a metallic mold is produced, which may be in the shape of an airfoil, for example in the desired shape of the turbine blade tip, or in a simpler geometric shape with the understanding that post-build machining will be performed. FIG. 2 illustrates an exemplary metallic mold 200, which is provided in the shape of an airfoil. The metallic mold may have a larger airfoil cross-section than desired for the blade tip in order to account for shrinkage during the HIP process. The metallic mold 200 has a hollow interior portion, wherein the metal and ceramic powder mixture is disposed. In some embodiments, metallic mold 200 is made of nickel metal/alloy. In other embodiments, the metallic mold 200 is made from another metal, which may be in one embodiment, for example, a steel that can be chemically etched-away post-build. The metallic mold 200 may be formed using a suitable metal component additive manufacturing process, such as electron-beam welding. Forming the metallic mold 200 in this manner allows for a wide range of possible airfoil designs, shapes, and configurations. The metallic mold 200 may have a length (transverse to the airfoil shape) such that a plurality of tip pieces may be sliced from a single mold, once the HIP process has been completed.

As noted above, alternative embodiments of the metallic mold may not be in the shape of airfoil, but in a simpler geometric shape. While making a HIP can in the shape of the airfoil tip is a suitable manner to minimize waste, however, since the amount of shrink that occurs during the HIP process may be unpredictable, some stock-added may be required (in some embodiments), and the finial tip shape will then be cut out using machining processes. As such, it is not essential that the HIP can be airfoil tip-shaped as shown in FIG. 2. In some embodiments, the presently disclosed method may be performed by cutting out several "stacks" from a larger, simply-shaped hip can, provided the aspect ratio of that simple shape is sufficiently large to allow thru cutting, via water jet, for example.

The metal and ceramic powder mixture is filled into the metallic mold 200, and then the metallic mold 200 is sealed. Sealing may be accomplished using conventional metallurgical processes, such as welding. The sealed metallic mold 200 (or "HIP can") is placed within a HIP vessel. The metallic mold 200 filled with the metal and ceramic powder is subjected to a HIP process to densify the metal and ceramic powder. The ceramic particles thus remain distributed throughout the resulting densified article.

The metal and ceramic powder mixture is then sealed within the mold under vacuum. The sealed mold is subjected to a hot isostatic pressing process, which compacts and binds the powder mixture together. The HIP process utilized according to the present disclosure may proceed in with any suitable conditions. In exemplary processes, the HIP process may utilize an isostatic pressure of about 30,000 pounds per square inch (psi) in combination with a temperature of about 1500° C. The pressure and temperature may, however, be any suitable conditions, and accordingly the temperature may also be less than 1500° C. in some embodiments and greater than 1500° C. in other embodiments (e.g., from about 500° C. to about 2200° C.); and the pressure may be less than 30,000 psi in some embodiments and greater than 30,000 psi in other embodiments (e.g., from about 15,000 psi to about 45,000 psi). The metallic mold 200 with the metal and ceramic powder therein may be subjected to such HIP conditions for any suitable time period in order to densify the powder depending on the temperature and pressure used, for example from several minutes to several hours or more (e.g., from about 5 minutes to about 5 hours). The densified metal powder within the interior portion of the metallic mold 200, which results from the HIP processing, has a pressure-densified microstructure that exhibits isotropic mechanical and physical properties. The metallic mold (canister or "can") may or may not be removed via subsequent processing. Additionally, the densified metal powder may be subject to further heat treatments after the HIP process is completed, to achieve a desired microstructure or other desired material property of the resulting airfoil-shaped article.

Once the airfoil-shaped article, with abrasive particles distributed therein, has been fabricated as described above, it may be sliced transversely to its length to provide a plurality of airfoil-shaped slices of the metal alloy, each of which being a "tip piece" suitable for adding on to a turbine blade to provide the abrasive tip to the turbine blade, as discussed above. The number of slices available, as described above, depends both on the length of the metallic mold 200 and on the desired thickness of the slices. A slice may be bonded to the turbine blade using, for example, diffusion bonding or transient liquid phase bonding.

Once the tip piece of the present disclosure is bonded on to the blade, the turbine blade may be finished using conventional processes. These processes may include, but are not limited to, further heat treatments, machining, and surface finishing treatments such as polishing and coatings.

Method

Figure 3:
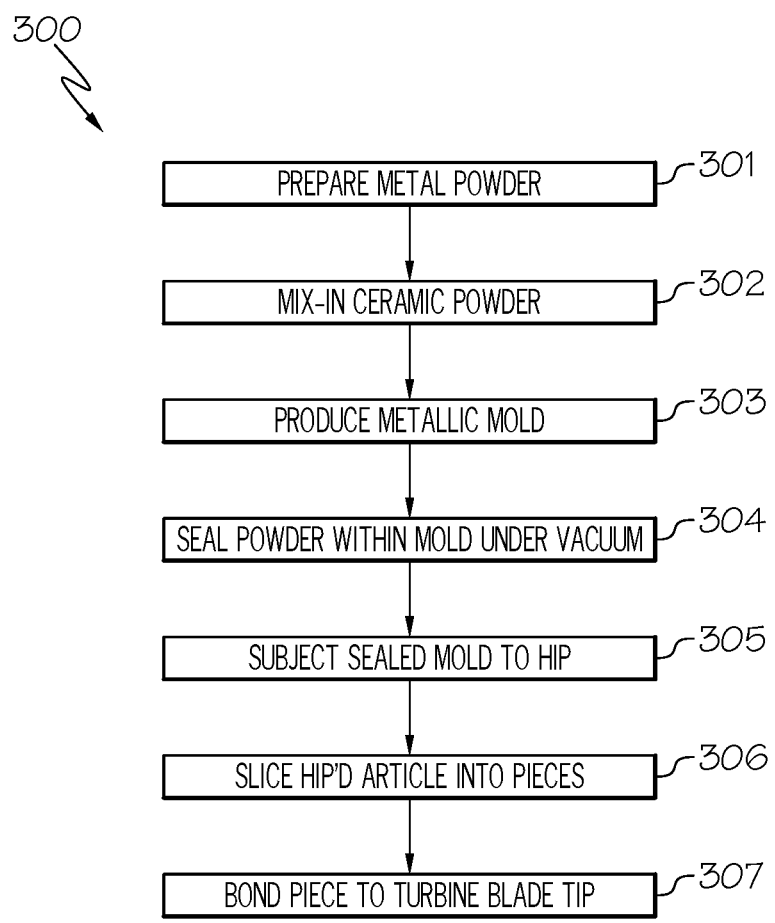
FIG. 3 is a flowchart illustrating a method of producing an abrasive tip for a turbine blade in accordance with an embodiment of the present disclosure.

In accordance with the foregoing, a method 300 of producing an abrasive tip for a turbine blade is illustrated in FIG. 3. At step 301, a metal powder is prepared using an atomization process. The metal powder is an alloy that is suitable for use in a turbine blade, such as (but not limited to) a nickel-based superalloy. At step 302, a hard, abrasive ceramic powder is mixed into the metal powder. The ceramic powder may be alumina, zirconia, silicon carbide, or a mixture of two or more thereof. At step 303, a metallic mold is produced in the shape of an airfoil, specifically in the desired shape of the turbine blade tip. At step 304, the metal and ceramic powder mixture is sealed under vacuum within the mold (alternatively, the vacuum may be pulled inside the can after sealing). At step 305, the sealed mold is subjected to a hot isostatic pressing process, which compacts and binds the powder mixture together. At step 306, the compacted and bonded powder mixture is sliced into pieces of appropriate thickness for the turbine blade tip. Conventional methods, such as water jet cutting, for example, or others, may be used at this step. At step 307, a slice may be bonded to the turbine blade using, for example, diffusion bonding or transient liquid phase bonding. The method 300 may contain additional steps not recited herein. The method 300 may have the method steps performed in an alternative order than as described.

As such, the present disclosure has provided embodiments of an improved method of producing an abrasive tip for a turbine blade. The method desirably avoids fabrication methods that limit the design of the blade tip by forming the blade tip (with abrasive particles distributed throughout) using HIP in a mold that can be designed in virtually any suitable shape.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of producing an abrasive tip for a turbine blade, comprising:
   producing or obtaining a metal powder that is mixed with an abrasive ceramic powder;
   producing or obtaining a metallic mold that is in a shape of an airfoil, wherein the metallic mold comprises a hollow interior portion;
   sealing the metal and ceramic powder mixture within the hollow interior portion of the metallic mold under vacuum;
   subjecting the sealed mold to a hot isostatic pressing process, whereby the hot isostatic pressing process compacts and binds the metal and ceramic powder mixture together into a solid article in the shape of the airfoil;
   slicing the solid article into a plurality of airfoil-shaped slices; and
   bonding one slice of the plurality of airfoil-shaped slices to a tip portion of a turbine blade.

2. The method of claim 1, wherein the metal powder is produced using an atomization process.

3. The method of claim 1, wherein the metal powder comprises a nickel-based superalloy.

4. The method of claim 3, wherein the nickel-based superalloy comprises, by weight: about 1.5% to about 5.5% chromium, about 8% to about 12% aluminum, about 4% to about 8% tantalum, about 1.5% to about 5.5% tungsten, less than about 1% of one or more of elements selected from a group consisting of carbon, boron, zirconium, yttrium, hafnium, and silicon, and a balance of nickel.

5. The method of claim 3, wherein the nickel-based superalloy comprises, by weight: about 5% to about 12% cobalt, about 3% to about 10% chromium, about 5.5% to about 6.3% aluminum, about 5% to about 10% tantalum, about 3% to about 10% rhenium, about 2% to about 5% of one or more of elements selected from a group consisting of platinum, ruthenium, palladium, and iridium, about 0.1% to about 1.0% hafnium, about 0.01% to about 0.4% yttrium, about 0.01% to about 0.15% silicon, and a balance of nickel.

6. The method of claim 1, wherein the ceramic powder is selected from the group consisting of: alumina, zirconia, silicon carbide, and a mixture of two or more thereof.

7. The method of claim 1, wherein the ceramic powder consists of particles having a mean diameter (d50) of from about 10 microns to about 1000 microns.

8. The method of claim 7, wherein the ceramic powder consists of particles having a mean diameter (d50) of from about 50 microns to about 500 microns.

9. The method of claim 1, wherein the metal and ceramic powder mixture has a weight ratio of metal powder to ceramic powder of from about 100:1 to about 10:1.

10. The method of claim 9, wherein the metal and ceramic powder mixture has a weight ratio of metal powder to ceramic powder of from about 50:1 to about 20:1.

11. The method of claim 1, wherein the metallic mold is produced using an additive manufacturing process.

12. The method of claim 1, wherein the metallic mold comprises a nickel metal/alloy or a steel.

13. The method of claim 1, wherein the hot isostatic pressing process is performed at a temperature of from about 500° C. to about 2200° C., at a pressure of from about 15,000 psi to about 45,000 psi, and for a time period of from about 5 minutes to about 5 hours.

14. The method of claim 1, wherein bonding the one slice is performed using diffusion bonding or transient liquid phase bonding.

15. The method of claim 1, wherein the turbine blade comprises a nickel-based superalloy.

16. The method of claim 1, further comprising performing a finishing process on the turbine blade after the step of bonding the one slice, wherein the finishing process is selected from the group consisting of: heat treating, machining, surface finishing, polishing, and coating.

17. A method of producing an abrasive tip for a turbine blade, comprising:
   producing or obtaining a metal powder that is mixed with an abrasive ceramic powder;
   producing or obtaining a metallic mold that is in a shape of an airfoil, wherein the metallic mold comprises a hollow interior portion; wherein the ceramic powder consists of particles having a mean diameter (d50) of from about 10 microns to about 1000 microns, and wherein the metal and ceramic powder mixture has a weight ratio of metal powder to ceramic powder of from about 100:1 to about 10:1;
   sealing the metal and ceramic powder mixture within the hollow interior portion of the metallic mold under vacuum;
   subjecting the sealed mold to a hot isostatic pressing process, whereby the hot isostatic pressing process compacts and binds the metal and ceramic powder mixture together into a solid article in the shape of the airfoil;
   slicing the solid article into a plurality of airfoil-shaped slices; and
   bonding one slice of the plurality of airfoil-shaped slices to a tip portion of a turbine blade, wherein bonding the one slice is performed using diffusion bonding or transient liquid phase bonding.

18. The method of claim 17, wherein the metallic mold is produced using an additive manufacturing process.

19. The method of claim 17, wherein the metallic mold comprises a nickel metal/alloy or a steel.

20. A method of producing an abrasive tip for a turbine blade, comprising:
producing or obtaining a metal powder that is mixed with an abrasive ceramic powder;
producing or obtaining a metallic mold that is in a shape of an airfoil, wherein the metallic mold comprises a hollow interior portion; wherein the ceramic powder consists of particles having a mean diameter (d50) of from about 50 microns to about 500 microns, wherein the metal and ceramic powder mixture has a weight ratio of metal powder to ceramic powder of from about 50:1 to about 20:1, and wherein the metallic mold is produced using an additive manufacturing process;
sealing the metal and ceramic powder mixture within the hollow interior portion of the metallic mold under vacuum;
subjecting the sealed mold to a hot isostatic pressing process, whereby the hot isostatic pressing process compacts and binds the metal and ceramic powder mixture together into a solid article in the shape of the airfoil;
slicing the solid article into a plurality of airfoil-shaped slices;
bonding one slice of the plurality of airfoil-shaped slices to a tip portion of a turbine blade, wherein bonding the one slice is performed using diffusion bonding or transient liquid phase bonding; and
performing a finishing process on the turbine blade after the step of bonding the one slice, wherein the finishing process is selected from the group consisting of: heat treating, machining, surface finishing, polishing, and coating.

\* \* \* \* \*